United States Patent
Holder

(10) Patent No.: US 9,103,910 B2
(45) Date of Patent: Aug. 11, 2015

(54) USING ORTHOGONAL SPACE PROJECTIONS TO GENERATE A CONSTANT FALSE ALARM RATE CONTROL PARAMETER

(71) Applicant: Propagation Research Associates, Inc., Marietta, GA (US)

(72) Inventor: Ernest Jefferson Holder, Canton, GA (US)

(73) Assignee: Propagation Research Associates, Inc., Marietta, GA (US)

( * ) Notice: Subject to any disclaimer, the term of this patent is extended or adjusted under 35 U.S.C. 154(b) by 0 days.

(21) Appl. No.: 14/586,836

(22) Filed: Dec. 30, 2014

(65) Prior Publication Data

US 2015/0109165 A1  Apr. 23, 2015

Related U.S. Application Data

(63) Continuation-in-part of application No. 13/984,058, filed as application No. PCT/US2013/038537 on Apr. 26, 2013.

(60) Provisional application No. 61/638,934, filed on Apr. 26, 2012, provisional application No. 61/779,531, filed on Mar. 13, 2013.

(51) Int. Cl.
  *G01S 7/02* (2006.01)
  *G01S 7/292* (2006.01)
  (Continued)

(52) U.S. Cl.
  CPC .............. *G01S 13/04* (2013.01); *G01S 7/023* (2013.01); *G01S 7/2922* (2013.01); *G01S 7/2927* (2013.01); *G01S 7/34* (2013.01); *H04B 1/10* (2013.01); *H04B 1/1027* (2013.01)

(58) Field of Classification Search
  CPC ...... G01S 7/023; G01S 7/2922; G01S 7/2927; G01S 7/34; H04B 1/10; H04B 1/1027
  USPC .............. 342/91–93, 159–164; 375/147, 148, 375/346, 347
  See application file for complete search history.

(56) References Cited

U.S. PATENT DOCUMENTS 3,720,942 A   3/1973   Wilmot et al.
4,486,756 A   12/1984  Peregrim et al.
(Continued)

FOREIGN PATENT DOCUMENTS

WO   WO 97/42520 A1   11/1997

OTHER PUBLICATIONS

Louis L. Scharff and Michael L. McCloud, Blind Adaptation of Zero Forcing Projections and Oblique Psuedo-Inverses for Subspace Detection and Estimation When Interference Dominates Noise, IEEE Transactions on Signal Processing, Dec. 2002, pp. 2938-2946, vol. 50, No. 12, IEEE.

(Continued)

*Primary Examiner* — Peter Bythrow
(74) *Attorney, Agent, or Firm* — Robert A. Blaha; Smith Risle Tempel Santos LLC

(57) ABSTRACT

An adaptive parameter for adjusting a threshold in a sensor system that provides a constant false alarm rate is disclosed. A projection space generator performs projection operations to create a matched projection space and first and second mismatched projection spaces such that each mismatched projection space is orthogonal or nearly orthogonal to the matched projection space. A mitigator engine receives the matched and first mismatched projection spaces and generates a covariance matrix from the first mismatched projection space and an image space from the covariance matrix and the matched projection space. A second mismatched projection space that is mismatched to both the matched and first mismatched projection spaces is provided to a clutter characterization engine that generates samples from the second mismatched projection space and the covariance matrix. The adaptive parameter is generated from the samples and is used as an input to a threshold adjuster in a target detector.

20 Claims, 6 Drawing Sheets

(51) Int. Cl.
*G01S 7/34* (2006.01)
*H04B 1/10* (2006.01)
*G01S 13/04* (2006.01)

(56) References Cited

U.S. PATENT DOCUMENTS

| | | | |
|---|---|---|---|
| 4,713,664 | A | 12/1987 | Taylor, Jr. |
| 4,845,500 | A | 7/1989 | Cornett et al. |
| 5,465,095 | A | 11/1995 | Bryant |
| 6,697,633 | B1 | 2/2004 | Dogan et al. |
| 6,711,219 | B2 * | 3/2004 | Thomas et al. ............... 375/346 |
| 6,856,945 | B2 | 2/2005 | Thomas et al. |
| 7,099,377 | B2 * | 8/2006 | Berens et al. ................. 375/130 |
| 7,110,434 | B2 | 9/2006 | Currivan et al. |
| 7,120,657 | B2 * | 10/2006 | Ricks et al. ................... 708/322 |
| 7,136,410 | B2 | 11/2006 | Choi et al. |
| 7,167,884 | B2 | 1/2007 | Picciolo et al. |
| 7,177,351 | B2 | 2/2007 | Kadous |
| 7,333,919 | B2 | 2/2008 | Hayward et al. |
| 7,359,465 | B2 | 4/2008 | Olson et al. |
| 7,420,509 | B2 | 9/2008 | Minkoff |
| 7,430,253 | B2 | 9/2008 | Olson et al. |
| 7,463,609 | B2 | 12/2008 | Scharf et al. |
| 7,626,542 | B2 * | 12/2009 | Kober et al. ............. 342/357.29 |
| 7,643,538 | B2 | 1/2010 | Currivan et al. |
| 7,660,231 | B2 | 2/2010 | Tulino |
| 7,873,097 | B1 * | 1/2011 | Luecke et al. ................. 375/147 |
| 7,903,024 | B2 | 3/2011 | Tietjen et al. |
| 7,907,912 | B2 | 3/2011 | Nam et al. |
| 8,121,177 | B2 | 2/2012 | Narayan et al. |
| 2002/0152253 | A1 * | 10/2002 | Ricks et al. ................... 708/520 |
| 2002/0197958 | A1 * | 12/2002 | Collins et al. ................... 455/63 |
| 2003/0198305 | A1 * | 10/2003 | Taylor et al. .................. 375/341 |
| 2003/0210179 | A1 * | 11/2003 | Dizaji et al. ................... 342/159 |
| 2004/0151235 | A1 * | 8/2004 | Olson et al. ................... 375/148 |
| 2005/0007278 | A1 * | 1/2005 | Anson et al. .................. 342/451 |
| 2005/0180364 | A1 * | 8/2005 | Nagarajan et al. ............ 370/335 |
| 2006/0153283 | A1 * | 7/2006 | Scharf et al. .................. 375/148 |
| 2006/0229051 | A1 | 10/2006 | Narayan et al. |
| 2008/0007454 | A1 * | 1/2008 | Minkoff ......................... 342/379 |
| 2009/0141775 | A1 * | 6/2009 | Kober et al. ................... 375/148 |
| 2011/0069796 | A1 | 3/2011 | Scharf et al. |
| 2012/0016921 | A1 | 1/2012 | Davenport et al. |
| 2012/0249361 | A1 * | 10/2012 | Sahinoglu et al. ............ 342/159 |

OTHER PUBLICATIONS

Sofiene Affes, Henrik Hansen and Paul Mermelstein, Interference Subspace Rejection: A Framework for Multiuser Detection in Wideband CDMA, IEEE Journal on Selected Areas in Communications, Feb. 2002, pp. 287-302, vol. 20, No. 2, IEEE.

Jonathan Landon, Brian D. Jeffs and Karl F. Warnick, Model-Based Subspace Projection Beamforming for Deep Interference Nulling, IEEE Transactions on Signal Processing, Mar. 2012, pp. 1215-1228, vol. 60, No. 3, IEEE.

Schmidt R.O., Multiple Emitter Location and Signal Parameter Estimation, IEEE Transactions on Antennas and Propagation, Mar. 1986, pp. 276-280, vol. AP-34, No. 3, IEEE.

Buckley K.M., Spatial/Spectral Filtering with Linearly Constrained Minimum Variance Beamformers, IEEE Transactions on Acoustics, Speech, and Signal Processing, Mar. 1987, pp. 249-266, vol. ASSP-35, No. 3, IEEE.

Goldstein J.S. and Reed I.S., Theory of Partially Adaptive Radar, IEEE Transactions on Aerospace and Electronic Systems, Oct. 1997, pp. 1309-1325, vol. 33, No. 4, IEEE.

Brennan L.E. and Reed I.S., Theory of Adaptive Radar, IEEE Transactions on Aerospace and Electronic Systems, Mar. 1973, pp. 237-252, vol. 9, No. 2, IEEE.

* cited by examiner

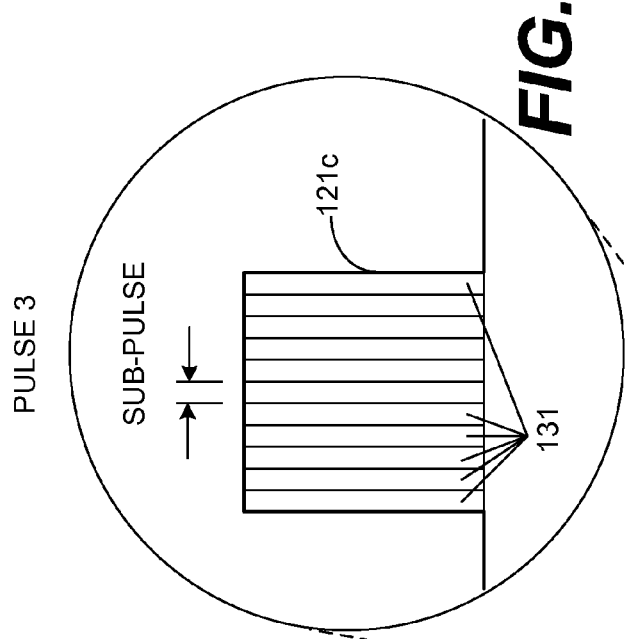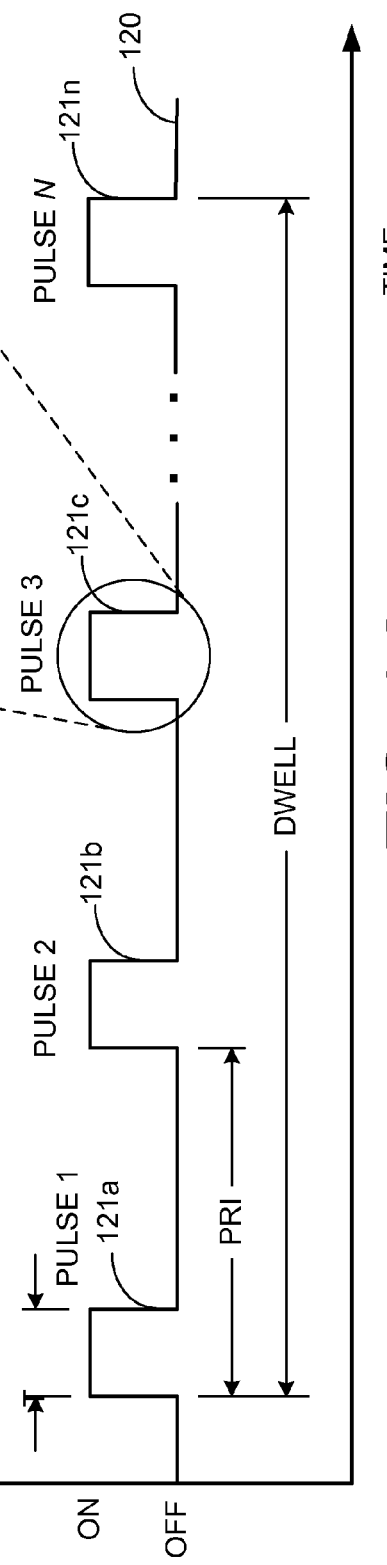

_US 9,103,910 B2_

USING ORTHOGONAL SPACE PROJECTIONS TO GENERATE A CONSTANT FALSE ALARM RATE CONTROL PARAMETER

CROSS-REFERENCE TO RELATED APPLICATIONS

This application is a continuation-in-part of U.S. non-provisional application assigned application Ser. No. 13/984,058, filed on Aug. 7, 2013, and entitled "Method and System for Using Orthogonal Space Projections to Mitigate Interference," incorporated herein by reference in its entirety, which application was a National Stage entry from PCT application number PCT/US2013/038537, filed on Apr. 26, 2013, and entitled "Method and System for Using Orthogonal Space Projections to Mitigate Interference," and which claimed the benefit of the filing date of a provisional application assigned application No. 61/638,934, filed on Apr. 26, 2012, entitled "Method and Apparatus for the Mitigation of Signal Interference," and provisional application assigned application number 61/779,531, filed on Mar. 13, 2013, entitled "Orthogonal Space Projection For Mitigation Interference," both of which are incorporated herein by reference in their entireties.

TECHNICAL FIELD

The present disclosure relates generally to systems and methods for processing signals. More particularly, the disclosure relates to systems and methods for identifying a true target in an environment with noise, clutter and other interference.

BACKGROUND

Constant false alarm rate (CFAR) detection refers to a conventional form of an adaptive algorithm used in sensor systems to detect signals reflected from a target against a background of noise, clutter and interference. A sensor system can use electromagnetic signals, sonar signals, acoustic signals or signals at any other frequency. A false alarm is an erroneous detection. That is a positive determination or decision about the presence of a target based on an interpretation of information in the detected signal when a valid target is not present. A false alarm is often due to background noise or interfering signals, which cause the detection signal to exceed a decision threshold. If the detection decision threshold is set too high, there are very few false alarms, but the reflected signal power required to exceed the decision threshold inhibits detection of valid targets. If the detection decision threshold is set too low, the large number of false alarms that result masks the presence of valid targets.

The false-alarm rate depends on the level of all interference, such as noise, clutter or artificial jammers. Any non-signal related voltage or current in a system is a source of noise. Clutter results from transmitted signals that are reflected from environmental features other than a target of interest (e.g., water, land, structures, etc.). Jammers or jamming signals are non-desired signals generated by a source other than the sensor or sensor system. Detection of sensor targets in shorter distances is usually inhibited by the clutter, while targets at longer distances are affected mostly by the background noise. Thus, the false alarm rate is range dependent. To achieve a higher probability of target detection, the decision threshold should be adapted to the environment. Conventional CFAR detectors employ a "background averaging" technique to dynamically adapt the decision threshold. Specifically for range-Doppler based signal systems, when noise is present in the radar signal, the maximum reflected energy in a cell-under-test is compared to an estimate of the interference (noise, clutter and any jammers) in the cell-under-test. These conventional systems determine an average level of interference from cells adjacent to the cell-under-test. This approach assumes that the clutter and interference is spatially and temporally homogeneous over the cells being used in defining for CFAR implementation. However, this is not the case for many environments.

The value of the adaptive threshold level is a function of the amplitudes in the range-Doppler cells surrounding the specific range-Doppler cell for which the process must derive the adaptive threshold. Furthermore, the number of surrounding range-Doppler cells (data points) needed to effectively compute an adaptive threshold varies with range-to-target, signal emitter-to-target attitude, noise, clutter, and intentional interference (e.g., a jamming signal or jammer) when present. If the environment of the surveillance area is dynamic, the signal processor must continue to vary, or adapt, the number of data points for each unique environmental region in the range-Doppler matrix, thus the term "adaptive threshold."

As stated above, the range-Doppler matrix typically reflects signal returns over a large surveillance area containing many environmental variations. In order to optimize target detection performance, the signal system's signal processor must be able to apply as many unique parameter sets as necessary to derive adaptive thresholds which accurately reflect each unique environmental region in the range-Doppler matrix. The conventional single instruction multiple data (SIMD) processor must process each unique parameter set in sequence. Since each sequential operation increases the overall time required to process the data stored in the range-Doppler matrix, the signal processor may not have enough time to derive an adaptive threshold for each unique environmental region. As a result, conventional signal processing systems to date have used various techniques to minimize the number of parameter sets used in order to save processing time. The "trade-off" is that the system may be forced to apply less than optimal parameter sets; therefore, less than optimal adaptive thresholds. This ultimately degrades target detection performance.

The concept of adaptive target detection thresholds is not unique. For example, U.S. Pat. No. 4,845,500 to Cornett et al discloses a radar video detector and target tracker in which an adaptive target detection threshold value is calculated for each target on every scan. The threshold values are computed by taking the radar video signals from a target or clutter and averaging the signals over small areas (cells) which are stored in memory for processing. These cells are elements in a matrix 'n' azimuth sectors and 'm' range bins in dimension. Stored values in the first and last row of cells are processed to establish the mean value and mean deviation value for each row in the window. The smallest values are subtracted from the averaged signals to establish revised amplitudes for each cell with reduced background noise. Each element is compared with its neighboring elements and target detection is indicated in a cell when at least one element of the two adjacent elements has a positive amplitude.

U.S. Pat. No. 4,713,664 to Taylor, Jr., discloses an adaptive threshold system which is used to set the alarm threshold level for Doppler filters. The system uses data corresponding to at least three antenna azimuth positions. The data is derived from adjacent coherent processing intervals in moving target detector (MTD) radar systems. The adaptive threshold level is governed by combinations of three or more azimuth data values in order to make the threshold level more closely match the residue curve rather than the input clutter from a point clutter source. Compensation of the threshold level determined from the three azimuth data values is provided by signals from the zero Doppler filter output. Additional compensation is provided for other system variables, such as changes in the scan rate, radar instability, and conventional constant false alarm rate processing. The threshold system combines the largest of the clutter input values with the compensating signals by use of a log power combiner to provide the combined and compensated threshold level.

U.S. Pat. No. 4,486,756 to Peregrim et al. discloses a method of reducing angle noise in a radar system. Energy is transmitted in an arbitrarily chosen frequency pair symmetrically disposed about the tuning frequency of the radome of the radar, and the complex monopulse ratios of the return signals are formed. The sum magnitude and the magnitude of the imaginary part of the complex monopulse ratio, determined for each frequency pair, are subjected to selected thresholds in order to reject erroneous data points. A sum channel threshold and a threshold on the imaginary part of the complex monopulse ratios are utilized. Both of these thresholds vary as a function of the missile-to-target range. In addition, a glint threshold is also utilized. The glint threshold is an adaptive threshold predicated on a desired probability of false alarm.

U.S. Pat. No. 3,720,942 to Wilmot et al. discloses a system for automatically processing quantized normal and moving target indicator (MTI) radar video to provide improved clutter rejection and improved detection of moving targets in clutter. The quantized video is applied to a mean level detector. The sensitivity of the mean level detector is controlled as a function of the number of detected target reports being stored in an output buffer unit in order to provide the proper threshold. The output of the mean level detector and the quantized normal video are applied to a video selector circuit for automatic selection of subsequent detection and processing.

U.S. Pat. No. 5,465,095 to Bryant discloses a system that subdivides the range-Doppler matrix into several equally-sized elements. The radar system performs a process on the equally-sized elements in parallel. The process involves an integration process implemented over each cell in an element. This yields a secondary data array of equal dimension to the original element. Target detection thresholds for each cell are determined from the information in the secondary data arrays.

Although these patents relate to various methods for processing radar signals and enhancing target detection, they do not describe an efficient process for computing a generalized adaptive target detection threshold.

SUMMARY

A sensor processing system uses orthogonal space projections to generate a constant false alarm rate control parameter. The system includes a projection space generator, a mitigator engine, a clutter characterization engine, and a parameter generator. The projection space generator performs a first projection operation on a received signal to generate a first or matched projection space that is matched to the signal or signals of interest. The projection space generator performs a second projection operation on the received signal to generate a first mismatched projection space that is mismatched to the signal or signals of interest. The projection space generator performs a third projection operation to generate a second mismatched projection space that is mismatched to both the first or matched projection space and the first mismatched projection space. Both mismatched projection spaces are orthogonal or nearly orthogonal to the first matched projection space. The mitigator engine receives the matched and first mismatched projection space and generates a covariance matrix from the mismatched projection space. The mitigator engine also generates an image space from the covariance matrix and the first projection space. A clutter characterization engine receives the second mismatched projection space and the covariance matrix. The clutter characterization engine generates samples of non-desired signal energy when present. The parameter generator receives the samples from the clutter characterization engine and generates a control parameter that is forwarded to a threshold adjuster.

A method for developing an adaptive control parameter in a sensor processing system includes the steps of receiving, with a processor, a time-varying series of pulses responsive to desired and non-desired signal energy; performing, with the processor, a projection operation on the time-varying series of pulses with a mismatched projection to generate a first and second mismatched projection spaces, wherein each mismatched projection space includes non-desired signal energy and a reduced or removed desired signal energy; generating, with the processor, a set of coefficients of a covariance matrix from the first mismatched projection space; applying, with the processor, the set of coefficients to a second mismatched projection space to generate samples responsive to the non-desired signal energy; applying, with the processor, the samples to a function that identifies the probability of a false target being identified from the non-desired signal energy alone; and adjusting, with the processor, a control parameter in response to the probability of a false target identified from the non-desired signal energy alone.

A non-transitory computer-readable medium having code stored thereon for execution by a processor in a sensor system, the computer-readable medium comprising a projection module arranged to perform a projection operation responsive to a set of received pulses to generate a first and second mismatched projection spaces such that each mismatched projection space includes non-desired signal energy and a reduced or removed desired signal energy, a mitigator module arranged to generate a covariance matrix from the first mismatched projection space, a clutter characterization module generated from the second mismatched projection space that is arranged to receive a copy of the mismatched projection space and the covariance matrix and configured to generate samples responsive to the non-desired signal energy in the set of received pulses, and a control module arranged to receive the samples and configured to generate a control parameter in response to a probability of a false target or signal being identified from the non-desired signal energy alone.

These and other features and advantages presented in the disclosure will become apparent from the following description, drawings and claims.

BRIEF DESCRIPTION OF THE DRAWINGS

FIG. 2A is a schematic diagram of an example embodiment of a series of transmit signal pulses generated and transmitted by the sensor system of FIG. 1.

FIG. 2B is a schematic diagram illustrating sub-pulses within an example pulse selected from the series of transmit signal pulses of FIG. 2A.

DETAILED DESCRIPTION

Figure 1:
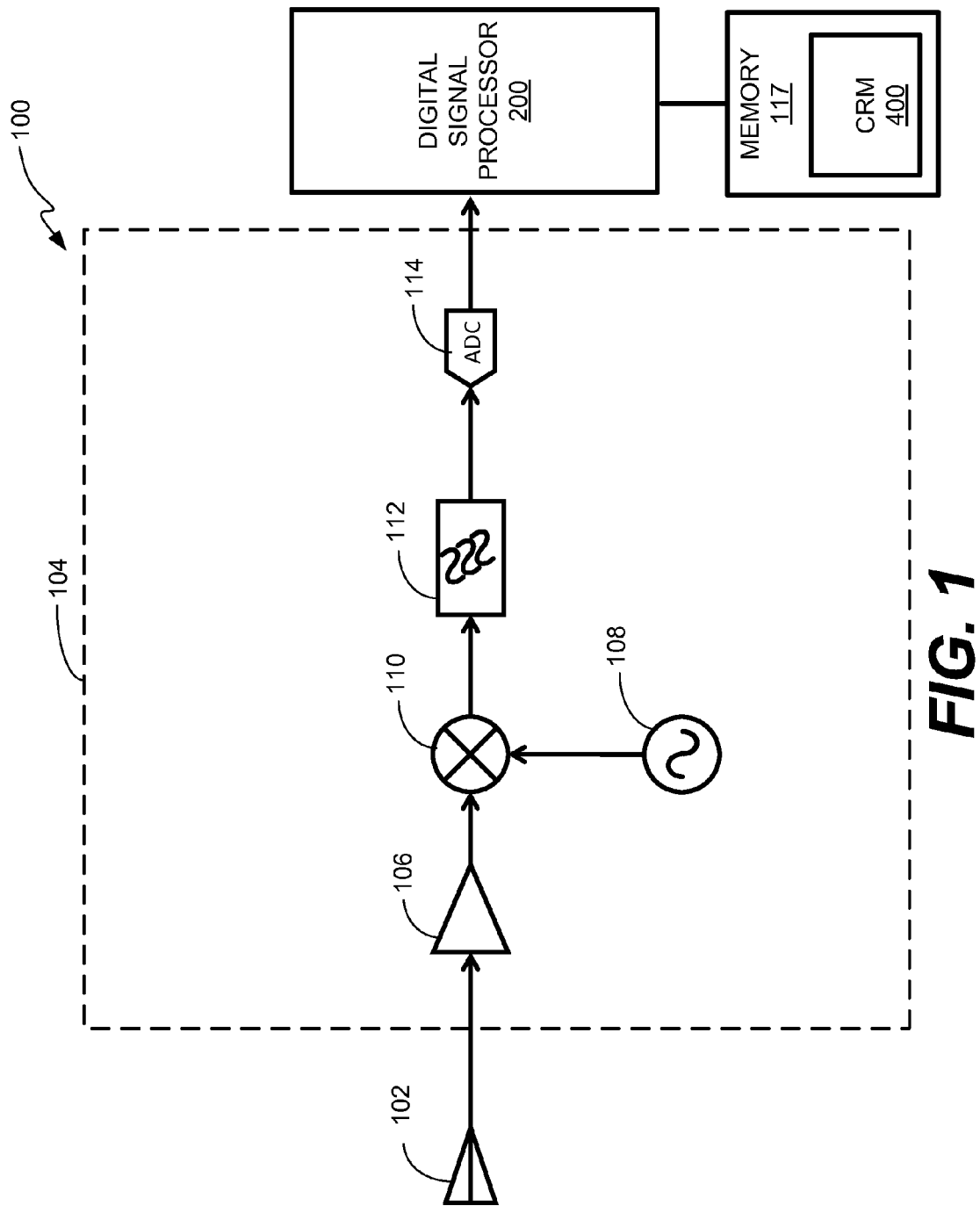
FIG. 1 is a block diagram of an example embodiment of a sensor system that uses orthogonal space projections to generate a control parameter.

The following description is directed toward an example signal processor that uses a matched projection space and mismatched projection spaces derived from received signals in an example radar system. In the example embodiments, signal projections are performed in a range domain and the separation domain is Doppler. The desired signal is separated from the clutter or undesired signal energy to create a Range-Doppler (RD) image that has eliminated the clutter and/or undesired signal energy. However, the described techniques are not limited to RD images alone and can be applied to alternative image spaces such as range-angle, polarization-Doppler, range-angle-Doppler, polarization-angle-Doppler or other combinations of desired signal characteristics. In the RD application, clutter, in the form of reflections of transmitted signal energy from surfaces other than surfaces of a target, will be the non-desired signal. However, in other signal spaces, such as Range-Angle, Polarization-Angle, or possibly Doppler-Angle, the non-desired signal may include interference from jammers, other radars, or other signal sources other than the sensor system.

An innovative adaptive CFAR mode uses waveform diversity to provide enhanced detection of targets in various types of clutter. The disclosed approach uses orthogonal projections that provide both a matched filter space for signal compression and mismatched filter spaces for clutter mitigation and CFAR parameter definition. This unique approach performs clutter mitigation and adaptive CFAR detection over a single radar dwell requiring that background clutter remain stationary only over a few tens of milliseconds and that the dwell duration include some number of multiple clutter decorrelation intervals. Since the disclosed clutter mitigation and CFAR approach is applied over a single dwell, the technique can be applied on a dwell-by-dwell basis allowing the CFAR to adapt to clutter that is changing characteristics at a rate bounded below by the dwell rate, which will allow the technique to adapt to clutter environments that are somewhat stationary but still sufficiently decorrelated over the dwell time such as sea and ground clutter. The disclosed CFAR technique uses real-time empirical methods to optimize CFAR target detection thresholds using simultaneous estimates of the signal plus clutter and the clutter only. Consequently, the disclosed technique both cancels clutter and adapts CFAR thresholds for detection of small maritime targets.

The second mismatched projection space eliminates the target signal and transforms highly non-Gaussian clutter (e.g., sea clutter) into Gaussian clutter through an application of the central limit theorem using a weighted sum of clutter returns. The matched projection compresses the target signal and also transforms the non-Gaussian clutter into Gaussian clutter with equivalent mean and standard deviation as the mismatch filtered (i.e., transformed) clutter. In addition, the mismatched clutter output is correlated with the matched clutter output and the disclosed orthogonal space projection (OSP) technique uses the mismatched clutter to cancel the matched clutter. The disclosed OSP CFAR technique uses a third waveform that is orthogonal to the other two signals to create a second mismatched projection space that is used to characterize the clutter statistics and determine the clutter levels for the matched filter output.

An improved system, method and non-transitory computer-readable medium use orthogonal space projections to generate a CFAR control parameter. A received signal is forwarded to a projection space generator that performs separate projection operations to generate a first projection space and a second projection space. The first projection space includes RD information that may include reflections from one or more actual targets as well as reflections from environmental sources (e.g., clutter) and perhaps other noise. The second projection space, denoted first mismatched projection space, includes RD information that is orthogonal to the RD information in the first projection space. The first mismatched projection space includes clutter and perhaps other noise, but does not include the one or more targets. A third projection space, denoted second mismatched projection, that is mismatched to the both the first matched projection space and the second mismatched projection space generates a clutter characterization engine. A mitigator engine receives the first projection and first mismatched projection spaces, generates a covariance matrix from the first mismatched projection space and derives a RD image space with the covariance matrix and the first projection space. The clutter characterization engine uses the second mismatched projection space and the covariance matrix to generate samples responsive to the clutter and other noise in the received signal. A parameter generator receives the samples and uses the same to generate a control input to a threshold adjuster. The control input is adaptive to clutter and noise in each dwell. Thus, the threshold adjuster can be used to change a threshold level in a target detector.

Once separated into projection space(s), the information contained in the projection space(s) is manipulated to separate the signal-of-interest, or target signal, from the interference and clutter to generate an image space. The projection operation(s) separates the received signal, which includes the target signal and interference, from the interference by projecting the received signal into a subspace that is orthogonal, or nearly orthogonal, to the target signal. By definition, the portion of the interference that remains after this orthogonal projection has been performed does not contain a significant amount of signal energy. A second projection operation that is matched to the target signal may also be performed on the received signal, or on the received signal after it has had the interference mitigated, but this is not always necessary or useful.

Some examples of signal spaces that are useful for the projection operation are code spaces, frequency spaces, and time spaces. Some examples of signal spaces that are useful for image separation are angle, range and frequency. There are several advantages to the orthogonal space projection (OSP) approach described herein. One advantage is that the use of orthogonal projections produces a representation of the interference that is truly isolated from the target signal in that the projection containing the interference is orthogonal to, or nearly orthogonal to, the target signal. This enables subsequent operations to be performed that optimally or nearly optimally remove the interference. Another advantage is that the projection operation can be orthogonal to a large class of target signals, which makes it well suited for removing interference from multiple target signals. Another advantage is that the orthogonal projection requires only one projection processing interval, which may be, for example, the compression interval of a spread-spectrum signal. This obviates the need to perform time averaging processes that depend on the ergodic nature of the interference with respect to the desired signal to identify the interference and the desired signal and then create a weighting function that optimizes a cost function.

Various illustrative embodiments are described herein, including, for example, embodiments that use orthogonal or nearly orthogonal projections in RD subspaces, and embodiments that use only a single orthogonal or nearly orthogonal projection operation on a set of received signals to reduce the interference for a large class of signals. As used herein, the following terms have the following meanings The term "matched projection" refers to a projection that reaches its maximum value when operating on the target signal, or signal-of-interest. The terms "orthogonal projection" and "mismatched projection" refer to a projection that is orthogonal to or nearly orthogonal to a matched projection. The term "image space" refers to a parameter space representation of the signal after the projection operation(s) has been performed. The term "dwell" refers to the time it takes to process signal returns from N pulses transmitted at a given pulse repetition frequency (PRF), where N is a positive integer.

FIG. 1 is a block diagram of an illustrative embodiment of a signal down conversion analog process for a RD sensor such as a radio detection and ranging (RADAR) system 100. The system 100 includes an antenna 102, an analog front end 104 and a digital processor 200 supported by a memory 117. Although the antenna 102 is illustrated in a receive-only mode of operation, those skilled in the art of signal down-conversion system architectures and signal transceivers will understand how to use the antenna 102 in both transmit and receive modes of operation. Alternatively, those skilled in the art of signal up-conversion system architectures and signal transceivers will understand how to integrate one or more transmit channels in the system 100.

As shown in the illustrated embodiment, the analog front end 104 includes a low-noise amplifier 106, a modulated reference generator 108, a mixer 110, a band-pass filter 112, and an analog-to-digital converter (ADC) 114. Although a single receive channel enabled by a single analog front end 104 is shown, those skilled in the art will understand that one or more additional receive channels may be included. For ease of illustration, only one receive channel is shown in FIG. 1.

Those skilled in the art of sensor system architectures and signal processing will understand how to replace the antenna 102 with one or more transducers (not shown) to apply the signal processing techniques illustrated and described in association with FIGS. 2-6 in a sound navigation and ranging or sonar system. Since the acoustic frequencies used in sonar systems may vary from very low (e.g., infrasonic) to extremely high (e.g., ultrasonic), operating characteristics and/or the arrangement of various elements within the analog front end 104 may vary accordingly. As briefly described, these variations may include additional receive channels and one or more transmit channels.

FIG. 2A includes an example embodiment of transmit signal pulses 121a-121n generated and transmitted by the sensor system 100 of FIG. 1. Time is illustrated along the abscissa from left to right (or along the positive X-axis) and transmit signal energy or transmit signal amplitude is indicated along the ordinate (or positive Y-axis). A time-varying transmit signal trace 120 includes N pulses where N is a positive integer. The time-varying transmit signal trace 120 transitions between no transmit signal energy and equally spaced times where a desired transmit signal energy is applied to the antenna 102. As indicated in FIG. 2A, a dwell is defined as the time from the leading or rising edge of the first pulse 121a to the falling edge of the last or $N^{th}$ pulse 121n. A period or time between the rising edge of each respective pulse and the rising edge of the next subsequent pulse defines a pulse repetition interval (PRI). A PRI can be subdivided into Doppler or slow-time bins. Each of the pulses 121a-121n has a width or active time, T, during which the sensor system 100 is transmitting energy via the antenna 102 followed by the remaining portion of the PRI, during which the sensor system is not transmitting. The system 100 may be receiving transmitted and reflected energy at any time after the initial pulse 121a is transmitted.

FIG. 2B includes an example embodiment of a set of sub-pulses 131 that together form pulse 121c. Each of the N pulses in the series of pulses during the dwell can be similarly sub-divided into fast-time or range bins. The time between a transmitted pulse 121a and a correlated pulse that is received at the antenna 102 can be used to determine a distance between the system 100 and a surface that reflected a transmitted pulse when the propagation rate of the transmitted signal is known. The number of sub-pulses 131 or sub-divisions of a transmit or active time is directly related to the accuracy or resolution of the range or distance between the system 100 and a detected target.

Details of the operation of the signal processor 200 will be described in conjunction with an example embodiment illustrated in FIG. 3 and FIG. 4. As further indicated in FIG. 1, the memory 117 may include a portion of the total storage capacity (e.g., a computer-readable medium (CRM) 400 for storing the various modules illustrated and described in conjunction with the example embodiment illustrated in FIG. 4.

The signal received at the antenna 102 is comprised of the sum of the target signal and the interference signal, which may be expressed mathematically as S+J. The interference signal, J, will include clutter and other sources of interference. The sensor system 100 operates as follows. An electrical signal is received at antenna 102. The antenna 102 outputs an electrical signal (i.e., S+J) to amplifier 106. Amplifier 106 amplifies the electrical signal and delivers the amplified electrical signal to the mixer 110. The mixer 110 mixes the amplified electrical signal with a reference signal that is generated by the modulated reference generator 108. The signal exiting the mixer 110 passes through band-pass filter 112 and enters the ADC 114, which converts the analog signal into a digital signal. The digital signal is transferred to the digital-signal processor 200 for interference mitigation processing and for developing a control parameter.

The memory device 117 may be any computer-readable medium capable of storing program code and data thereon, such as, for example, a random-access memory (RAM) device, a read-only memory (ROM) device, a programmable read-only memory (PROM) device, an electronically programmable read-only memory (EPROM) device, a flash memory device, a compact disc (CD), a digital-video disc (DVD), a hard disk drive, a tape drive, and a memory card or stick. The digital signal processor 200 may be any type of processing device capable of processing computer code and data, such as, for example, a microprocessor, a microcontroller, an application-specific integrated circuit (ASIC), a system-on-chip (SoC), programmable grid array (PGA), a system-in-a-package (SIP), and a combination or two or more of these devices.

The illustrated embodiments make use of an observation that the received signal has temporal properties that make it possible to filter the signal into separate, respective filtered signals that are orthogonal to one another. A pulse-Doppler waveform is comprised of N (an integer number) of pulses that each have a transmit duration of T (pulse length) and are transmitted at rate which is denoted as the pulse repetition frequency (PRF) or in time as the pulse repetition interval (PRI). Range to a target is computed by comparing the time of return of each pulse relative to the time of transmit using the propagation rate of traveling waves of the transmitted signal in the transmission medium as the pulse velocity. For example, the speed of light may be used as a rate of transmission for electromagnetic waves in air, as may be transmitted by an antenna or an array of antennas deployed in a RADAR system. By way of further example, the speed of sound in air (adjusted for temperature and pressure) may be used as the rate of transmission in sensor systems that use sound in air to detect targets. In addition, the speed of sound in water (adjusted for temperature and pressure) may be used as the rate of transmission for underwater sensor systems. The Doppler frequency is computed using the returns of all of the N pulses over the waveform duration defined as [(N-1)(T)]/PRF. Each pulse can be subdivided and sampled at a higher rate than the PRF in order to create more and finer range bins or cells within a pulse. Since the pulse is sampled at a high rate, the processing associated with range processing is referred to as 'fast-time processing,' whereas the processing associated with Doppler processing is referred to as 'slow-time processing'. The subdivision of the pulse can be accomplished using, for example, code division multiple access (CDMA), time division multiple access (TDMA) or frequency division multiple access (FDMA). The received signal is sampled in both the fast-time and slow-time dimensions and then, using orthogonality in fast-time, the sampled signal is filtered into the matched-filtered signal and into the mismatched-filtered signal. The mismatched signal does not contain the target signal since it is created using a filter that is orthogonal to the target signal. However, the mismatched signal does contain the interference or clutter, which is correlated with the clutter in the matched RD matrix. The aforementioned image space, Y is obtained by processing the match-filtered signal and the mismatched-filtered signal in accordance with a method such as those presented above to separate the target signal S from the interference signal J.

The OSP clutter mitigation technique and CFAR control parameter generator use specific related waveforms. The disclosed techniques are optimized using three waveforms that have low cross correlation properties. For example, Kasami or Gold codes are binary phase codes that possess low cross correlation within a family of codes and are suitable. These waveforms form the foundation for the matched and at least two mismatched filter spaces. A first mismatched filter space is used to mitigate or reduce interference and clutter from the target signal. The mismatched filter space is generated by filtering (i.e., reducing) the desired signal using a reference signal that is nearly orthogonal to the desired signal. Since the reference signal may not be completely orthogonal to the desired signal a small residual signal that is correlated to the desired signal may remain after the "filtering" process. Consequently, the desired signal may not be entirely eliminated. The second mismatched filter space uses statistics derived from the first mismatched filter to characterize the non-desired signal energy including any clutter present.

The disclosed technique is a more straightforward approach to dealing with the non-Gaussian clutter. The improved RADAR system 100 uses an empirically derived CFAR test statistic using matched and mismatched filter spaces that transform the non-Gaussian clutter into Gaussian or nearly Gaussian clutter through a filter averaging process. Thus, the disclosed OSP CFAR processing technique is robust with respect to the nature of the underlying clutter or interference statistics and adapts to an optimized detection statistic. Other matched filter CFAR approaches have been used for clutter filled environments but those approaches usually require tractable solutions assuming stationary and homogeneous Gaussian clutter. Here, the clutter is assumed to be nearly stationary over the period of a single dwell and the CFAR is adapted on a dwell-to-dwell basis.

Figure 3:
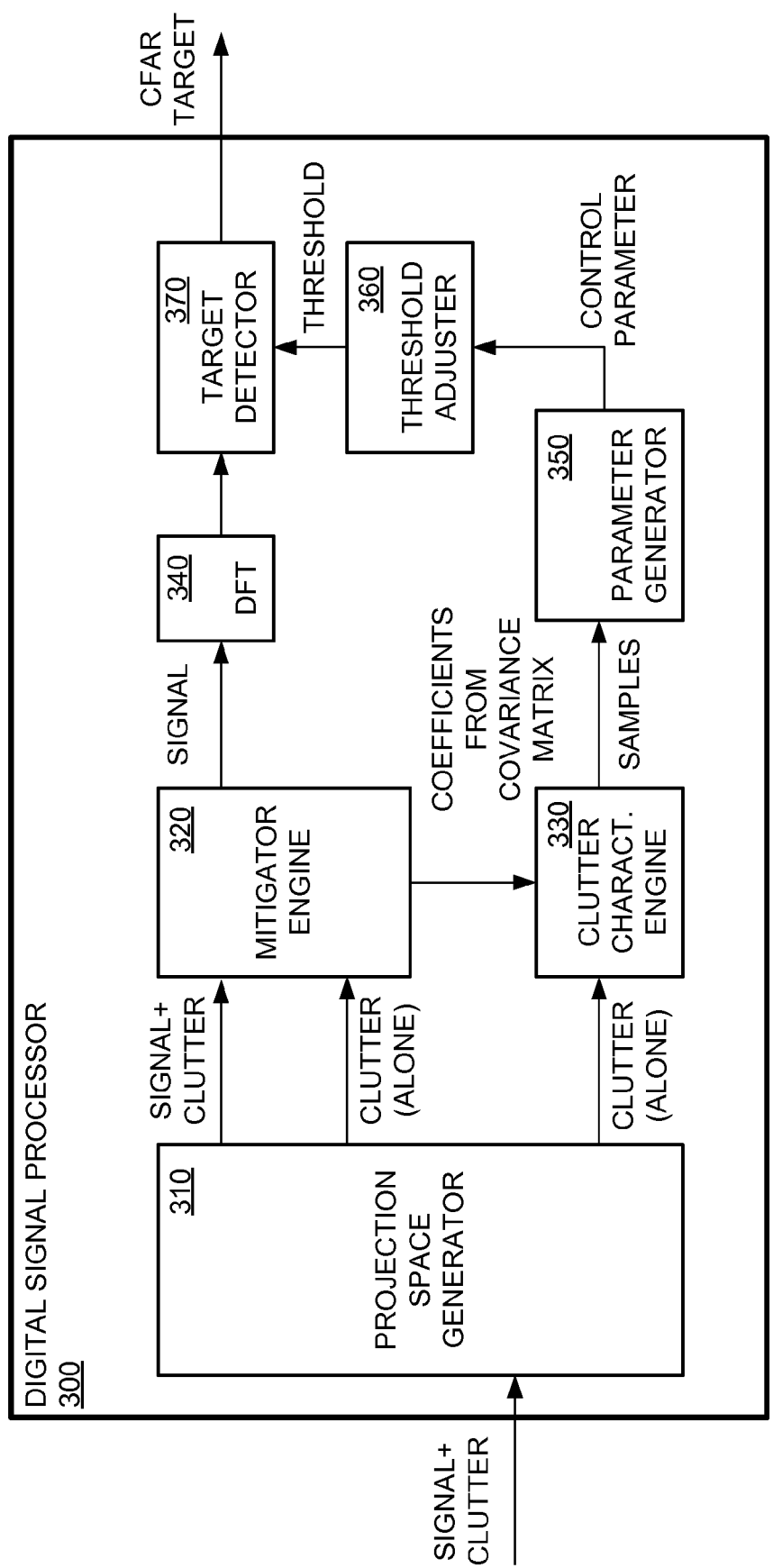
FIG. 3 is a block diagram of an example embodiment of the digital signal processor of FIG. 1.

FIG. 3 illustrates the fundamental signal flows of the OSP clutter mitigation and CFAR process. The disclosed technique cancels interference efficiently and establishes an adaptive CFAR threshold using a single compression interval (radar pulse or dwell). As briefly described, the OSP CFAR processing technique uses one empirical data set containing clutter plus target data and another simultaneous data set that contains only clutter data in order to adapt CFAR thresholds over a single dwell.

The OSP clutter mitigation and CFAR processing techniques can be applied in the RD domain to track moving targets in clutter. Matched and mismatched RD maps are derived from the product of fast and slow time Doppler space. The orthogonal mismatched projection removes the signal from each pulse to construct a RD map that does not contain the signal. As such the clutter-only RD map is used to cancel the clutter from the signal-plus-clutter RD map. The RD OSP algorithm can be defined as follows, $$S: \Pi_{range} \times \Pi_{Doppler} \rightarrow \Omega_{f\_fast-time} \times \Omega_{f\_slow-time} \subset \square^N \times \square^M \quad \text{Equation (1)}$$

$$J_{clutter}: \Pi_{range} \times \Pi_{Doppler} \rightarrow \Omega_{\_fast-time} \subset \square^N \times \square^M \quad \text{Equation (2)}$$

$$SJ_{N \times M} = S + J_{clutter} \quad \text{Equation (3)}$$

$$SPJ: \Pi_{range} \times \Pi_{Doppler} \rightarrow \Omega_{f\_fast-time} \times \Omega_{f\_slow-time} \quad \text{Equation (4)}$$

As illustrated in FIG. 3, the digital signal processor 200 is arranged with a projection space generator 310 that receives the digital representation of the combination of signal S and clutter J present in the received signal incident at the antenna 102 (FIG. 1) or in alternative embodiments the received signal incident upon a transducer or transducers for sonar systems and is arranged to generate a set of reference waveforms defined as $\bar{R} = [R_1 \, R_2 \, R_3 \ldots R_L]$, where $L \leq N$ and for each i, $R_i$: $\Pi_\rho \rightarrow \Omega_s = \square^N$ where $\rho_i \in \Pi_\rho$. The $R_1$ can be formed as shifted versions of a reference signal $R = R_1$ that is directly related to the signal S, where $\rho_i$ is related to the relative degree of circular shift associated with each $R_i$ and the reference vector R. The phase difference or circular shift $\rho_i$ corresponds to a time or range difference and the vector $\bar{\rho} = [\rho_1 \, \rho_2 \, \rho_3 \ldots \rho_L]$ determines the admissible parameters that define the pre-image space $\Pi_\rho^L \subset \square^L$. The projection space generator 310 also generates a set of vectors, $\bar{R}^\perp$, where each vector is orthogonal or nearly orthogonal to the vector R in $\square^N$. Thus, $\bar{r}^\perp = [R_1^\perp \, R_2^\perp \, R_3^\perp \ldots R_K^\perp]$, where $K \leq N$ and $R_i^\perp$ are linearly independent. In addition, the projection space generator 210 creates a set of vectors, $\overline{RR}^\perp$, that are orthogonal or nearly orthogonal to the vector, $\bar{R}^\perp$. The projection space generator 310 then uses reference waveforms and the generated vectors to form matched and mismatched projection spaces.

It should be noted that this is not the only way to create $\bar{R}^\perp$. Another example would be any set of K waveforms that are orthogonal or nearly orthogonal to R and linearly independent of one another. An operation can then be defined that takes the received signal and projects it into a space that is parallel to the reference vector. In addition, a set of operations can be defined that project the received signal into a set of spaces, each parallel to a vector, $R_i^\perp$. A set of projection operations is defined as:

$$SP_i = R_i \cdot SJ : \Pi_\rho \times \Pi_\Theta \to \Omega_s \subset \Box^M \; i^{th} \text{ Matched Signal Projection} \qquad \text{Equation (5)}$$

$$JP_i = R_i^\perp \cdot SJ : \Pi_\rho \times \Pi_\Theta \to \Omega_s \subset \Box^M \; i^{th} \text{ Mismatched Projection} \qquad \text{Equation (6)}$$

or $$\overline{SP} = SJ * \overline{R} \text{(matched space)} \qquad \text{Equation (5a)}$$

$$\overline{JP} = SJ * \overline{R}^\perp \text{(mismatched space)} \qquad \text{Equation (6a)}$$

A set of separation spaces is defined as:

$$Y_{RD} = (\overline{JP}^H \cdot \overline{JP})^{-1} \overline{JP}^T = Q^{-1} \cdot \overline{SP}^T$$

$$Y_{RD} : \Pi_{range} \times \Pi_{Doppler} \to \Omega_{range} \times \Omega_{f_{slow-time}}$$

The RD image space is defined as:

$$RD = DFT(Y_{RD}^H)$$

$$RD : \Pi_{range} \times \Pi_{Doppler} \to \Omega_{range} \times \Omega_{Doppler}$$

For example, if the projection space is a space of orthogonal modulations, then R would be a reference modulation and $R_1^\perp$ could be a single orthogonal modulation to R and the remaining $R_i^\perp$ would be the N-1 circular shifts of $R_1^\perp$. Then, $\overline{SP}$ can be defined as:

$$\overline{SP} = \overline{R}^H \cdot (S+J) \subset \Box^L \times \Box^M, \qquad \text{Equation (7)}$$

where, •, is a matrix multiply operation. The orthogonal projections are handled in a similar manner giving $$\overline{JP} = \overline{R}^{\perp H} \cdot (S+J) \subset \Box^K \times \Box^M \text{ (Orthogonal projection to R)} \qquad \text{Equation (8)}$$

Note, matrix multiplying by all the shifts of R or $R_1^\perp$ is equivalent to the convolution, $\otimes$, of R or $R_1^\perp$ with (S+J). Using the projected signal and the received signal to create the following outer products gives, $$Q(\overline{JP}) = \overline{JP}^H \overline{JP} \subset \Box^M \times \Box^M, \text{ and} \qquad \text{Equation (9)}$$

$$P(SJ) = SJ^H SJ \subset \Box^M \times \Box^M. \qquad \text{Equation (10)}$$

Q functions as a covariance matrix for the interference only using the multiple samples of R and $R^\perp$ that constitute a single processing interval. Thus, Q does not require a statistical process over multiple processing intervals. Similarly, P is the covariance of the original received signal, including the target signal and interference over a single processing interval. These variables are used to create an image space function, Y, dependent on the Q, P, and the separation parameters (possibly through a transformation V).

A matched projection space defined as $\overline{SP} = SJ * \overline{R}$, which may include a target of interest and clutter is forwarded to the mitigator engine 320. In addition, a mismatched projection space defined as $\overline{JP} = SJ * \overline{R}^{\perp 195}$, which includes clutter alone, is also forwarded to the mitigator engine 320. The mitigator engine 320 creates a separation space defined as, $$Y_{RD} = (\overline{JP}^H \cdot \overline{JP})^{-1} \overline{SP}^T = Q^{-1} \cdot \overline{SP}^T \qquad \text{Equation (11)}$$

or $Y_{RD} : \Pi_{range} \times \Pi_{Doppler} \to \Omega_{range} \times \Omega_{f\_slow-time}$ and a RD image space (with the clutter component removed) is defined by, $$RD = DFT(Y_{RD}^H) \qquad \text{Equation (12)}$$

which is forwarded to the discrete Fourier transform element (DFT) 340. The DFT 340 converts the time or spaced based data into frequency based data. The frequency based RD information is forwarded to the target detector 370. It should be noted that the DFT 340 can either be applied post-mitigation, as shown in Equation 12, or pre-mitigation prior to the projection space generator. In the latter case FIG. 3 would be altered to show the DFT 340 applied to the signal+clutter prior to projection generation.

A second mismatched projection space orthogonal to the matched projection space and the first mismatched projection space (and including clutter alone) is forwarded from the projection space generator 310 to the clutter characterization engine 330. The clutter characterization engine 330 also receives the coefficients from the covariance matrix derived from the clutter, as represented in the first space projection. The clutter characterization engine 330 creates a separation space or clutter statistics that represent the clutter over a single dwell defined as, $$W_{RD} = Q^{-1} \overline{JJP} \qquad \text{Equation (13)}$$

which clutter statistics are forwarded to the parameter generator 350.

It can be shown by way of simulation that for a range-power projection of a RD image map with strong clutter (about 0 dB) located at 0-4 m/s velocity and a −7 dB target with velocity 4 m/s, the clutter completely engulfs the target. After the above-disclosed OSP processing, where the projection operators are made up of matrices that contain shifts of the reference and orthogonal waveforms, the OSP processing compresses the target energy above the clutter signal. The clutter ridge around zero-Doppler is reduced by approximately 20 dB after OSP processing, allowing the target to compress up above the clutter ridge by around 11 dB. Thus, the OSP output from the second mismatched channel as indicated can used as an input to a clutter characterization engine 330 to generate statistics of the clutter alone to determine threshold levels for a given false alarm probability at the output of the matched filter.

The parameter generator 350 uses one or more functions to identify the probability of a false target being identified from the clutter statistics alone. A measure of the probability is used as a control parameter that is forwarded to the threshold adjuster 360.

The threshold adjuster 360 receives the control parameter from the parameter generator 350 and adjusts a threshold value that is applied as an input to the target detector 370. If it is assumed that the output is a one dimensional time series, f(k), as would be the case for the range bins defined in $\overline{JP}$ and $\overline{SP}$. It can be shown that the distribution at the output of both the matched and mismatched filters is approximated by a Gaussian distribution to a high degree. Such a normalized Gaussian distribution can be represented by the function, $$P_{FA}(x) = \frac{1}{\sqrt{2\pi}} e^{-x^2/2} \qquad \text{Equation (14)}$$

However, the RD information at the input to the target detector 370 calls for a two-dimensional adjustment. If S denotes the power spectrum off, the second moment is defined as, $$m_2 = \int_{-\infty}^{\infty} \omega^2 S(\omega) d\omega \qquad \text{Equation (15)}$$

The moment $m_2$ can also be expressed as the second derivative or curvature of the time series auto-correlation evaluated at the origin, as indicated below.

$$m_2 = -\frac{d^2 R_A}{dt^2}\bigg|_{t=0} \qquad \text{Equation (16)}$$

Research by others has showed that the number of local maxima per unit time is given by, $$N_1 = \frac{1}{2\pi}\sqrt{\alpha m_2} \qquad \text{Equation (17)}$$

If the process decorrelates between maxima, then the effective number of independent samples is determined as follows, $$N_{eff} = N_1 \cdot T \qquad \text{Equation (18)}$$

where T is the duration of the pulse.

Others have also shown that the normalized expression for the false alarm probability representing the matched filter output is given by, $$P_{FA}(x) = 1 - (1 - e^{-x^2/2})^{N_{eff}} \qquad \text{Equation (19)}$$

The expression for $P_{FA}$ is shown to be relatively insensitive to the term a and assuming $\alpha=1$ we have, $$P_{FA}(x) = 1 - \left(1 - e^{-x^2/2}\right)^{\frac{\gamma\sqrt{m_2}}{2\pi}} \qquad \text{Equation (20)}$$

The above can be extended to 2-dimensional matched filtering such as RD filtering using, $$P_{FA}(x) = 1 - \left(1 - xe^{-x^2/2}\right)^{\frac{A\sqrt{det(\Lambda_2)}}{(2\pi)^{3/2}}} \qquad \text{Equation (21)}$$

Where $\Lambda_2$ is the 2-dimensional symmetric matrix formed by the partial derivatives of the random 2-dimensional autocorrelation evaluated at the origin. The matrix $\Lambda_2$ is related to the curvature of the random field.

As an example of yet another alternative, it is also possible to utilize the OSP technique in implementing other conventional adaptive array algorithms that require a covariance matrix P for the signal plus interference and the covariance matrix Q for the orthogonal complement to the signal plus interference.

Using the above formalism, several known adaptive array processing algorithms, such as, for example, the Generalized Sidelobe Canceller (GSC) algorithm and the Minimum Variance Distortionless Response (MVDR) canceller algorithm can be reformulated to perform the OSP method. In addition, persons of skill in the art will understand how to extend these results to eigenstructure-based techniques utilizing eigenvectors and eigenvalues associated with the matrices P and Q. The following demonstrates the manner in which these algorithms can be modified to achieve the OSP approach of the invention.

Modified Minimum Variance Distortionless Response $$W = \frac{Q^{-1}}{V^H \cdot P^{-1} \cdot V} \qquad \text{Equation (22)}$$

$$Y = \overline{SP}(\overline{\rho}) \cdot W^H \cdot V(\overline{\theta}) \qquad \text{Equation (23)}$$

$$[\hat{\rho} \ \hat{\theta}] = \max_{\rho,\theta}(|Y|) \qquad \text{Equation (24)}$$

Notice that Y is not linear in V, so the DFT would not work to compute the image space.

Modified Generalized Sidelobe Canceller $$W_q = V(\theta_q) \text{ Look direction} \qquad \text{Equation (25)}$$

Define B as the M×M-1 dimensional space orthogonal to Wq $$W_q^H \cdot B = 0_{1 \times (M-1)} \qquad \text{Equation (26)}$$

$$W_a = W_q \cdot P \cdot B(BPB)^{-1} \qquad \text{Equation (27)}$$

$$W = W_q^H - BW_a^H = W_q^H - B(W_q \cdot P \cdot B(BPB)^{-1})^H = \qquad \text{Equation (28)}$$
$$(I - B(B^H P^H B^H)^{-1} B^H P^H)V^H$$

$$Y = \overline{SP}(\overline{\rho}) \cdot W^H \qquad \text{Equation (29)}$$

$$[\hat{\rho} \ \hat{\theta}] = \max_{\rho,\theta}(|Y|) \qquad \text{Equation (30)}$$

The Modified Minimum Variation Distortionless Response (MMVDR) and the Modified Generalized Sidelobe Canceller (MGSC) algorithms (shown above) use covariances derived from both the matched and mismatched projection spaces whereas Capon's method only uses a covariance generated form the mismatched projection space. There are other algorithms that could use covariances generated from both the matched and mismatched projection spaces as well.

Figure 4:
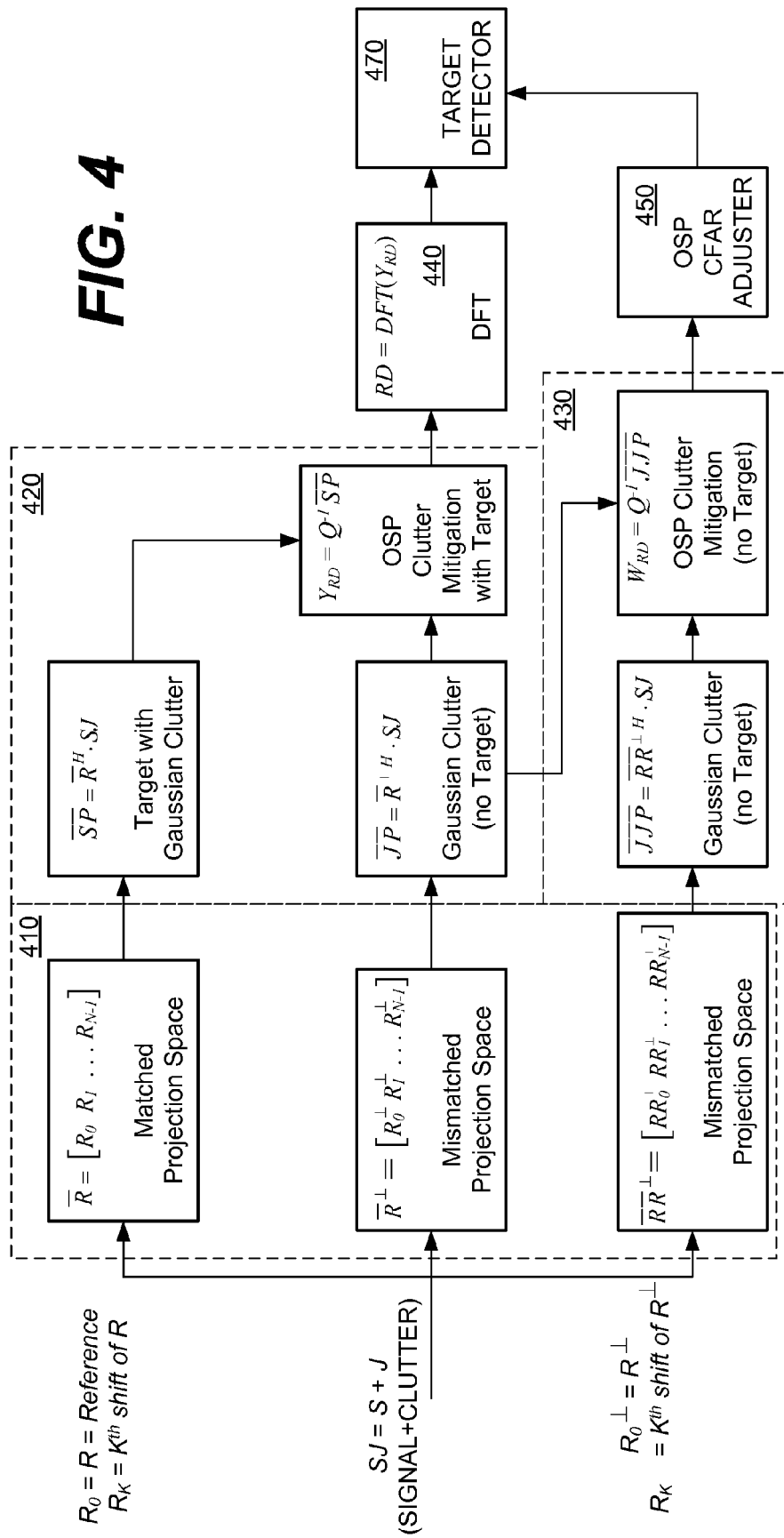
FIG. 4 is a block diagram of an alternative embodiment illustrating the various functions performed in the digital signal processor of FIG. 1.

FIG. 4 is a block diagram illustrating the various functions performed in the digital signal processor 200 of FIG. 1. A projection space generator 410, a mitigator engine 420 and a clutter characterization engine 430 are shown in broken line to indicate how the illustrated functions relate to the elements illustrated in the digital signal processor 200 of FIG. 3.

As described above, the projection space generator 410 receives signal information with both potential target(s) and clutter. The signal information resides in multiple dimensions where projection operators applied in one or more dimensions can generate an image and/or separation space with signal information separated in the remaining dimensions. The projection space generator 410 applies respective filters to the received signal to create a matched projection space (including information representing both the potential target(s) and the clutter) and two mismatched projection spaces (including information representing the clutter alone). The matched projection space and a first mismatched projection space are forwarded to the mitigator engine 420. The second mismatched projection space, which includes the clutter alone, is forwarded to the clutter characterization engine 430. The projection operation(s) could be identical or similar to those used in a single processing interval to receive the signal in the presence of no interference. This approach to interference/clutter suppression uses the image/separation spaces to optimize an objective function that detects or identifies the target within the image space. Some examples of signal spaces useful for the projection operation include; code spaces, frequency spaces, time spaces, or polarization spaces.

The mitigator engine 420 receives the matched projection space and the first mismatched projection space and performs a matrix operation on the received projection spaces to create a separation space that no longer includes or represents information from clutter. Some examples of signal spaces useful for image separation are angle, range and frequency.

The use of orthogonal projections produces a representation of the interference that is truly isolated (orthogonal or nearly orthogonal) from the signal-of-interest. This enables operations to be created that optimally or nearly optimally remove the interference. The projection operation can be orthogonal to a large class of signals of interest, thereby providing an opportunity for a clutter and interference mitigation process that can reduce clutter and interference for more than one signal-of-interest.

The orthogonal projection requires only one projection processing interval, such as the compression interval of a spread spectrum signal. This removes the requirement for time averaging results from processes that depend on the ergodic nature of the interference with respect to the signal to identify the interference and desired signal.

As further illustrated in FIG. 4, the DFT 440 receives the separation space, $Y_{RD}$, with the clutter and interference information removed and converts the separation space data from a time or space reference frame to frequency. The RD image space generated by the DFT 440 (i.e., frequency-based information) is forwarded to the target detector 470.

The clutter characterization engine 430 receives the second mismatched projection space from the projection space generator 410 and uses the coefficients from the from the covariance matrix derived from the clutter, as represented in the first space projection to generate a separation space or clutter statistics $W_{RD}$ that represent the clutter over a single dwell. The OSP CFAR adjuster 450 receives the clutter statistics and determines a probability of a false positive determination of a target from the clutter alone in two-dimensions and forwards the result on a dwell-by-dwell basis to the target detector 470 which uses the result from the OSP CFAR block to adjust a target threshold.

Figure 5:
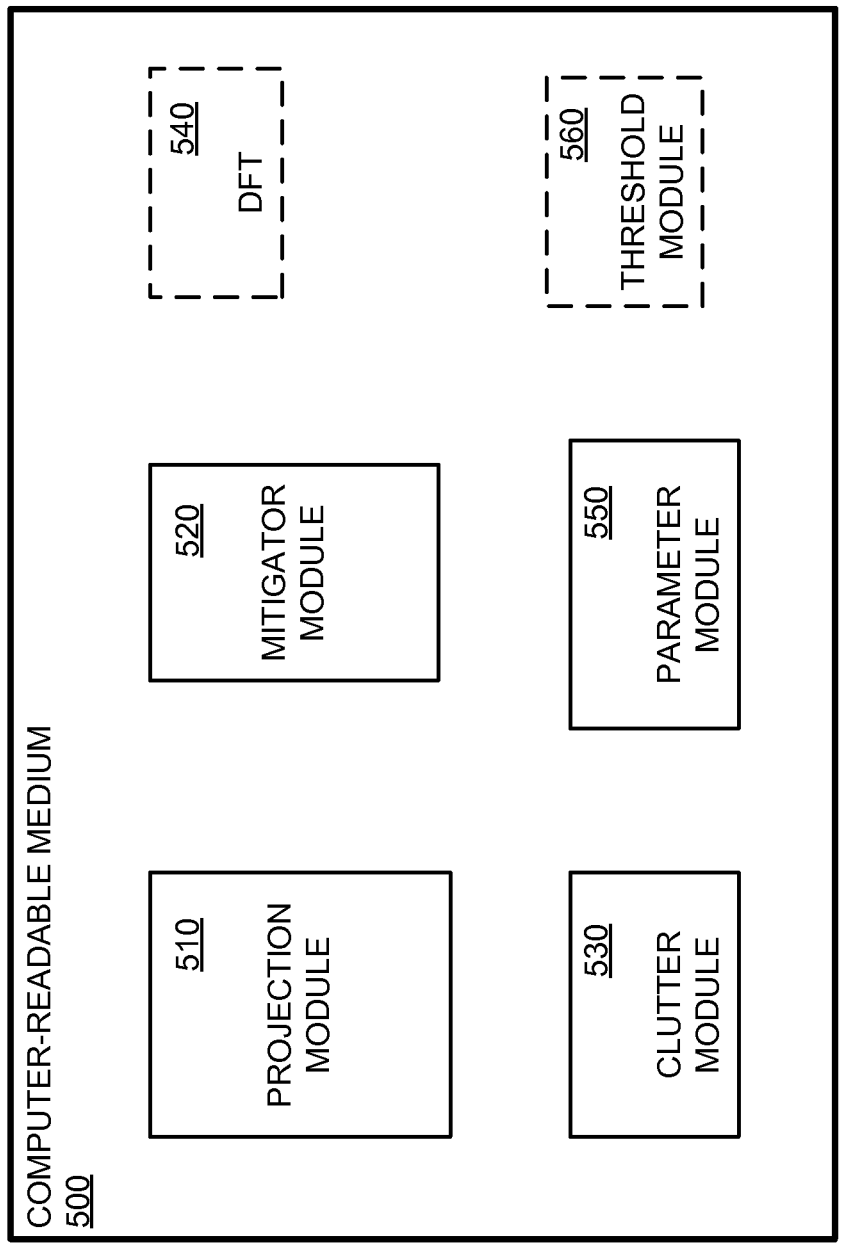
FIG. 5 is a block diagram of an example embodiment of a computer-readable medium including code that can be read and executed by the sensor system of FIG. 1.

FIG. 5 is a block diagram of an example embodiment of a computer-readable medium 500 including code (e.g., executable instructions, scripts, algorithms) that can be read and executed by the improved sensor system 100 of FIG. 1. The computer-readable medium 500 includes a projection module 510, a mitigator module 520, a clutter module 530, and a parameter module 550. As further indicated in FIG. 5 by way of broken lines, the computer-readable medium 500 optionally includes a discrete Fourier transform module or DFT 540, and a threshold module 560.

The projection module 510 includes code that transforms a received signal in accordance with one or more multiple dimension projection space operations. For example, at least one projection operation may use code division multiple access (CDMA) codes for phase diversity, time division multiple access (TDMA) time slots for time diversity, frequency division multiple access (FDMA) frequencies for frequency diversity. In some arrangements, one or more polarizers may be deployed in the analog front end 104 to provide diversity. The mitigator module 520 includes code that receives first and second projection spaces (one matched projection space and one mismatched projection space) from the projection module 510 and generates a separation space by generating a covariance matrix from the clutter information in the mismatched projection space and applying the covariance matrix in a matrix operation to remove the clutter from the signal-of-interest. The clutter module 530 includes code that receives a copy of the mismatched projection space and the coefficients from the covariance matrix generated in the mitigator module 520. The clutter module 530 further includes code that applies the coefficients from the covariance matrix to generate a separation space representing the clutter alone.

The parameter module 550 includes code that receives the samples in the separation space representing the clutter alone and generates an adaptive control signal on a dwell by dwell basis. The optional threshold module 560 receives the adaptive control signal from the parameter module 550 and applies one or more of equation 14 through equation 21 to develop a measure of the probability of identifying a target from information in the clutter alone. The optional DFT 540 includes code that receives equally spaced samples of the separated signal space or signal-of-interest from the mitigator module 520 or the digitized representation of the received signal and converts the equally spaced samples from the multi-dimensional representation into the frequency domain.

Figure 6:
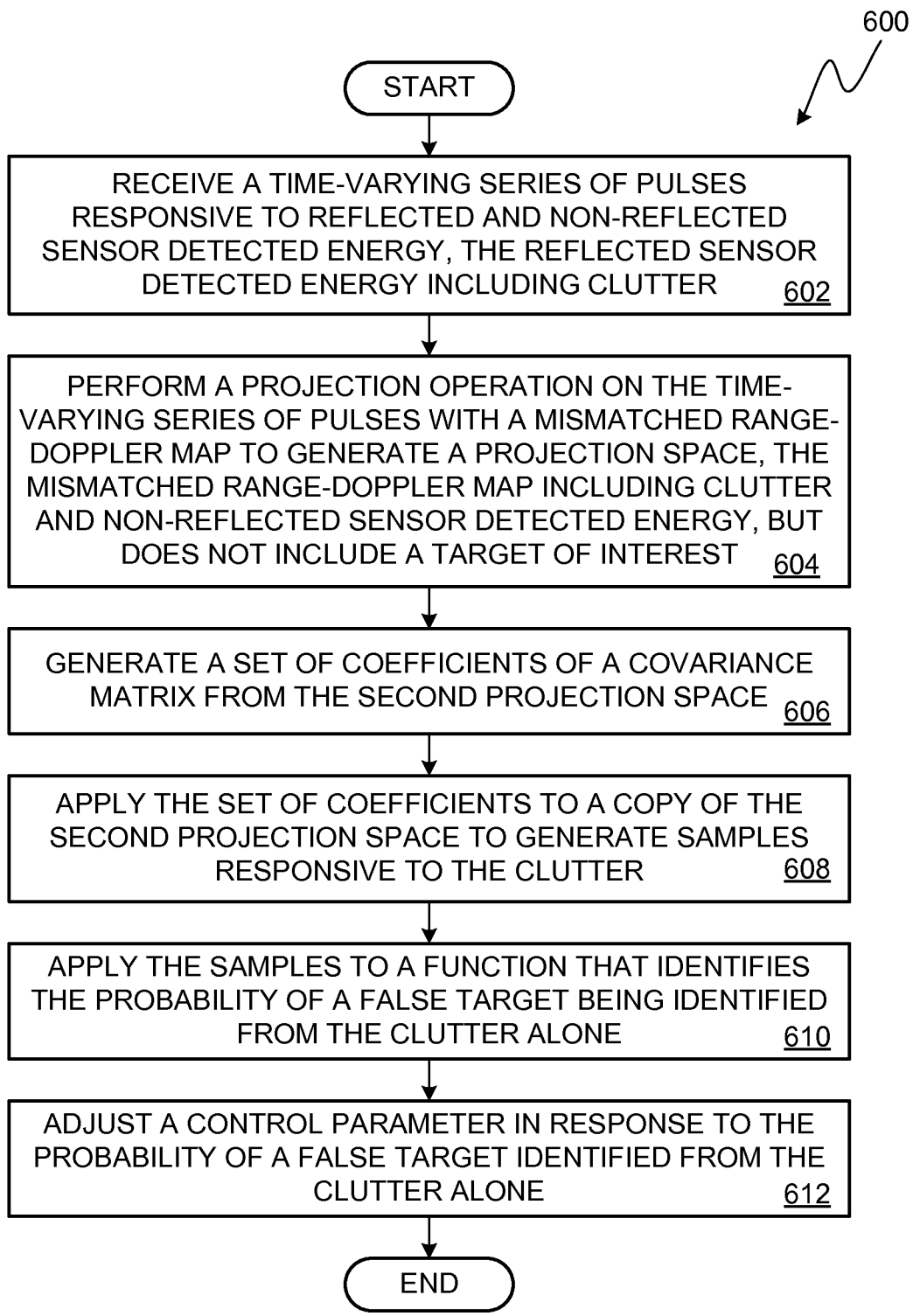
FIG. 6 is a flow diagram of an example embodiment of a method for developing an adaptive control parameter in the sensor system of FIG. 1.

FIG. 6 is a flow diagram of an example embodiment of a method 600 for developing an adaptive control parameter in the sensor system 100 of FIG. 1. The method begins with block 602 where a time-varying series of pulses responsive to reflected and non-reflected sensor detected energy are received in a digital signal processor. As further indicated in block 602, the reflected sensor detected energy may include clutter. In block 604, a projection operation is performed on the received time-varying series of pulses with a mismatched RD map to generate a projection space, the mismatched RD map including clutter and non-reflected sensor detected energy but not including a target of interest. In block 606, a set of coefficients of a covariance matrix is generated from the second or mismatched projection space. As indicated in block 608, the set of coefficients are applied to second mismatched projection space (i.e., a third projection space orthogonal to both the matched and the mismatched projection spaces) to generate samples responsive to the clutter. Thereafter, as illustrated in block 610, the samples are applied as an input to a function that identifies the probability of a false target being identified from the clutter alone. The probability of a false target being identified from the clutter alone is used to adjust a control parameter, as indicated in block 612.

It should be noted that signal processing techniques for generating a control parameter have been described with reference to a few illustrative, or exemplary, embodiments to demonstrate principles and concepts. It will be understood by those skilled in the art that the disclosed systems and methods are not limited to these embodiments, but may be modified in a number of ways while still achieving the goals of generating an accurate CFAR control parameter that adapts to clutter statistics in a single dwell.

For example, the circuit elements, logic or processes described above with reference to FIGS. 1 through 6 may be different from those that are explicitly disclosed. While the OSP techniques have been described as being performed entirely within a single digital signal processor 200, some of the tasks could instead be performed in analog circuitry, such as the matched and mismatched filtering operations. Persons skilled in the art will understand, in view of the description provided herein, these and other modifications may be made while still generating an accurate CFAR control parameter that adapts to clutter statistics in a single dwell.

What is claimed is:

1. A system that creates an adaptive control parameter in a sensor processor that determines a detection threshold for desired signals-of-interest, the system comprising:
   a projection space generator arranged to perform a first projection operation and a second projection operation on a received signal to generate a matched projection space and a first mismatched projection space, respectively, such that the mismatched projection space is orthogonal or nearly orthogonal to the matched projection space, the mismatched projection space including non-desired signal energy and a reduced or removed desired signal energy;

a mitigator engine arranged to receive the matched projection space and the mismatched projection space, the mitigator engine configured to generate a covariance matrix from the first mismatched projection space and an image space from the covariance matrix and the matched projection space;

a clutter characterization engine generated from a second mismatched projection that is mismatched to both the matched and first mismatched projection spaces and the covariance matrix, the clutter characterization engine configured to generate samples of non-desired signal energy when present; and a parameter generator arranged to receive the samples and configured to generate a control parameter for a threshold adjuster.

2. The system of claim 1, wherein the control parameter is calculated for a single dwell.

3. The system of claim 1, wherein the control parameter is responsive to clutter.

4. The system of claim 1, wherein the control parameter is responsive to non-desired signal energy statistics.

5. The system of claim 1, wherein the control parameter is adaptable from a first dwell to a second dwell adjacent in time to the first dwell.

6. The system of claim 1, wherein a desired signal component and a non-desired signal component are present in the received signal and represented in the matched projection space.

7. The system of claim 6, wherein the non-desired signal component, but not the desired signal component or at least not any significant residual signal related to the desired signal component, is represented in the first and second mismatched projection spaces.

8. The system of claim 7, wherein the mitigator engine essentially removes the non-desired signal component from the desired component and the non-desired component in the matched projection space to mitigate the non-desired component present in the receive signal.

9. The system of claim 1, wherein the samples generated by the clutter characterization engine are responsive to the non-desired component alone.

10. The system of claim 1, wherein at least one projection operation uses phase, time, frequency, or polarization diversity.

11. The system of claim 1, wherein the sensor processor uses an algorithm that includes a covariance derived from the matched projection space and a second covariance derived from the mismatched projection space.

12. A method for generating an adaptive control parameter in a sensor processor that determines a detection threshold for desired signals of interest, the method comprising:

receiving, with a processor, a time-varying series of pulses responsive to desired signal energy and non-desired signal energy;

performing, with the processor, a projection operation on the time-varying series of pulses to generate a first and second mismatched projection space, wherein the mismatched spaces include non-desired signal energy and a reduced or removed desired signal energy;

generating, with the processor, a set of coefficients of a covariance matrix from the first mismatched projection space;

applying, with the processor, the set of coefficients to a second mismatched projection space to generate samples responsive to non-desired signal energy;

applying, with the processor, the samples to a function that identifies the probability of a false target being identified from non-desired signal energy alone; and adjusting, with the processor, a control parameter in response to the probability of a false target identified from the non-desired signal energy alone.

13. The method of claim 12, wherein the projection operation uses one selected from the group consisting of code division multiple access (CDMA) codes, time division multiple access (TDMA) time slots, frequency division multiple access (FDMA) frequencies and diverse polarizations.

14. The method of claim 12, wherein the control parameter is modifiable for each dwell.

15. The method of claim 12, wherein the control parameter is responsive to non-desired signal energy statistics.

16. A non-transitory computer-readable medium having computer code stored thereon for execution by a processor, the computer-readable medium comprising:

a projection module arranged to perform a projection operation responsive to a set of received pulses to generate a first and second mismatched projection space such that each mismatched projection space includes non-desired signal energy and a reduced or removed desired signal energy;

a mitigator module arranged to generate a covariance matrix from the first mismatched projection space;

a clutter characterization module generated from the second mismatch projection space that is arranged to receive the covariance matrix and configured to generate samples responsive to the non-desired signal energy in the set of received pulses; and a control module arranged to receive the samples and configured to generate a control parameter in response to a probability of a false target being identified from the non-desired signal energy alone.

17. The computer-readable medium of claim 16, wherein the projection module performs the projection operation using one selected from the group consisting of code division multiple access (CDMA) codes, time division multiple access (TDMA) time slots, and frequency division multiple access (FDMA) frequencies.

18. The computer-readable medium of claim 16, wherein the projection module performs the projection operation using polarization diversity.

19. The computer-readable medium of claim 16, further comprising:

a threshold module arranged to receive the control parameter and modify a detection threshold.

20. The computer-readable medium of claim 16, wherein the control module generates the control parameter for each dwell.

* * * * *

UNITED STATES PATENT AND TRADEMARK OFFICE
CERTIFICATE OF CORRECTION

PATENT NO. : 9,103,910 B2
APPLICATION NO. : 14/586836
DATED : August 11, 2015
INVENTOR(S) : Ernest Jefferson Holder Page 1 of 3

It is certified that error appears in the above-identified patent and that said Letters Patent is hereby corrected as shown below:

On the Title Page

And in the Drawings in FIG. 4: The top line of the rectangle in the lower-left portion of item 420 includes a vertical line to the right of the letter "R":

$$\overline{JP} = \overline{R}^{\,H} \cdot SJ$$

And should read:

$$\overline{JP} = \overline{R}^{\perp H}\, SJ$$

In the Specification

In Column 10, Equation (1) is:

$$S : \Pi_{range} \times \Pi_{Doppler} \to \Omega_{f\_fast-time} \times \Omega_{f\_slow-time} \subset \Box^N \times \Box^M \quad \text{Equation (1)}$$

And should read:

$$S : \Pi_{range} \times \Pi_{Doppler} \to \Omega_{f\_fast-time} \times \Omega_{f\_slow-time} \subset \mathbb{C}^N \times \mathbb{C}^M \quad \text{Equation (1)}$$

In Column 10, Equation (2) is:

$$J_{clutter} : \Pi_{range} \times \Pi_{Doppler} \to \Omega_{\_fast-time} \subset \Box^N \times \Box^M \quad \text{Equation (2)}$$

And should read:

$$J_{clutter} : \Pi_{range} \times \Pi_{Doppler} \to \Omega_{f\_fast-time} \times \Omega_{f\_slow-time} \subset \mathbb{C}^N \times \mathbb{C}^M \quad \text{Equation (2)}$$

Signed and Sealed this
Eighth Day of August, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,103,910 B2

In Column 10, Line 42 is:

$\Pi_\rho \rightarrow \Omega_s = \square^N$ where $\rho_i \in \Pi_\rho$. The $R_i$ can be formed as shifted And should read:

$\Pi_\rho \rightarrow \Omega_S \subset \mathbb{C}^N$ where $\rho_i \in \Pi_\rho$. The $R_i$ can be formed as shifted In Column 10, Line 49 is:

image space $\Pi_\rho^L \subset \square^L$. The projection space generator 310

And should read:

image space $\Pi_\rho^L \subset \mathbb{C}^L$. The projection space generator 310

In Column 10, Line 51 is:

orthogonal or nearly orthogonal to the vector R in $\square^N$.

And should read:

orthogonal or nearly orthogonal to the vector $R$ in $\mathbb{C}^N$.

In Column 10, Line 52 is:

Thus, $\bar{r}^\perp = [R_1^\perp \ R_2^\perp \ R_3^\perp \ldots R_K^\perp]$,

And should read:

$\bar{R}^\perp = \begin{bmatrix} R_1^\perp & R_2^\perp & R_3^\perp & \ldots & R_K^\perp \end{bmatrix}$ In Column 11, Equation (5) is:

$SP_i = R_i \cdot SJ : \Pi_\rho \times \Pi_\theta \rightarrow \Omega_s \subset \square^M \ i^{th}$ Matched Signal Projection     Equation (5)

And should read:

$SP_i = R_i \ SJ : \Pi_\rho \times \Pi_\theta \rightarrow \Omega_S \subset \mathbb{C}^M \ i^{th}$ Matched Signal Projection     Equation (5)

In Column 11, Equation (6) is:

$JP_i = R_i^\perp \cdot SJ : \Pi_\rho \times \Pi_\theta \rightarrow \Omega_s \subset \square^M \ i^{th}$ Mismatched Projection     Equation (6)

And should read:

$JP_i = R_i^\perp \ SJ : \Pi_\rho \times \Pi_\theta \rightarrow \Omega_S \subset \mathbb{C}^M \ i^{th}$ Mismatched Projection     Equation (6)

CERTIFICATE OF CORRECTION (continued)
U.S. Pat. No. 9,103,910 B2

In Column 11, Line 12, the equation is:

$$Y_{RD} = (\overline{JP^H \cdot JP})^{-1} \overline{JP}^T = Q^{-1} \cdot \overline{SP}^T$$

And should read:

$$Y_{RD} = \cdot\left(\overline{JP}^H \ \overline{JP}\right)^{-1} \cdot = \overline{SP}^T \quad Q^{-1} \ \overline{SP}^T$$

In Column 11, Equation (7) is:

$$\overline{SP} = \overline{R}^H \cdot (S+J) \subset \square^L \times \square^M, \qquad\qquad \text{Equation (7)}$$

And should read:

$$\overline{SP} = \overline{R}^H \quad \subset \mathbb{C}^L \times \mathbb{C}^M, \qquad\qquad \text{Equation (7)}$$

In Column 11, Equation (8) is:

$$\overline{JP} = \overline{R}^{\perp H} \cdot (S+J) \subset \square^K \times \square^M \quad \text{(Orthogonal projection to } R) \qquad \text{Equation (8)}$$

And should read:

$$\overline{JP} = \overline{R}^{\perp H} (S+J) \subset \mathbb{C}^K \times \mathbb{C}^M \quad \text{(Orthogonal projection to } R) \quad \text{Equation (8)}$$

In Column 11, Equation (9) is:

$$Q(\overline{JP}) = \overline{JP}^H \overline{JP} \subset \square^M \times \square^M, \text{ and} \qquad\qquad \text{Equation (9)}$$

And should read:

$$Q(\overline{JP}) = \overline{JP}^H \overline{JP} \ \subset \mathbb{C}^M \times \mathbb{C}^M \quad, \text{and} \qquad \text{Equation (9)}$$

In Column 11, Equation (10) is:

$$P(SJ) = SJ^H SJ \subset \square^M \times \square^M. \qquad\qquad \text{Equation (10)}$$

And should read:

$$P(SJ) = SJ^H SJ \ \subset \mathbb{C}^M \times \mathbb{C}^M \ . \qquad\qquad \text{Equation (10)}$$

In Column 11, Line 52 is:

space defined as $\overline{JP} = SJ * \overline{R}^{195}$, which includes clutter alone, is And should read:

space defined as $\overline{JP} = SJ \quad \overline{R}^{\perp}$, which includes clutter alone, is

UNITED STATES PATENT AND TRADEMARK OFFICE
CERTIFICATE OF CORRECTION

PATENT NO. : 9,103,910 B2
APPLICATION NO. : 14/586836
DATED : August 11, 2015
INVENTOR(S) : Ernest Jefferson Holder Page 1 of 3

It is certified that error appears in the above-identified patent and that said Letters Patent is hereby corrected as shown below:

On the Title Page

And in the Drawings in FIG. 4: The top line of the rectangle in the lower-left portion of item 420 includes a vertical line to the right of the letter "R":

$$\overline{JP} = \overline{R}^{\perp H} \cdot SJ$$

And should read:

$$\overline{JP} = \overline{R}^{\perp H} \cdot SJ$$

In the Specification

In Column 10, Equation (1) is:

$$S:\Pi_{range} \times \Pi_{Doppler} \rightarrow \Omega_{f\_fast-time} \times \Omega_{f\_slow-time} \subset \square^N \times \square^M \quad \text{Equation (1)}$$

And should read:

$$S:\Pi_{range} \times \Pi_{Doppler} \rightarrow \Omega_{f\_fast-time} \times \Omega_{f\_slow-time} \subset \mathbb{C}^N \times \mathbb{C}^M \quad \text{Equation (1)}$$

In Column 10, Equation (2) is:

$$J_{clutter}:\Pi_{range} \times \Pi_{Doppler} \rightarrow \Omega_{\_fast-time} \subset \square^N \times \square^M \quad \text{Equation (2)}$$

And should read:

$$J_{clutter}:\Pi_{range} \times \Pi_{Doppler} \rightarrow \Omega_{f\_fast-time} \times \Omega_{f\_slow-time} \subset \mathbb{C}^N \times \mathbb{C}^M \quad \text{Equation (2)}$$

This certificate supersedes the Certificate of Correction issued August 8, 2017.

Signed and Sealed this
Twentieth Day of August, 2019

Andrei Iancu
*Director of the United States Patent and Trademark Office*

CERTIFICATE OF CORRECTION (continued)
U.S. Pat. No. 9,103,910 B2

In Column 10, Line 42 is:
$\Pi_\rho \to \Omega_s = \square^N$ where $\rho_i \in \Pi_\rho$. The $R_1$ can be formed as shifted
And should read:
$\Pi_\rho \to \Omega_S \square \mathbb{C}^N$ where $\rho_i \in \Pi_\rho$. The $R_i$ can be formed as shifted In Column 10, Line 49 is:
image space $\Pi_\rho^L \square \square^L$. The projection space generator 310
And should read:
Image space $\Pi_\rho^L \subset \mathbb{C}^L$. The projection space generator 310

In Column 10, Line 51 is:
orthogonal or nearly orthogonal to the vector R in $\square^N$.
And should read:
orthogonal or nearly orthogonal to the vector $R$ in $\mathbb{C}^N$.

In Column 10, Line 52 is:
$$\text{Thus, } \bar{r}^\perp = [R_1^\perp \ R_2^\perp \ R_3^\perp \ldots R_K^\perp],$$
And should read:
$$\bar{R}^\perp = \begin{bmatrix} R_1^\perp & R_2^\perp & R_3^\perp & \ldots & R_K^\perp \end{bmatrix}$$

In Column 11, Equation (5) is:
$$SP_i = R_i \cdot SJ : \Pi_\rho \times \Pi_\theta \to \Omega_s \subset \square^M \quad i^{th} \text{ Matched Signal Projection} \quad \text{Equation (5)}$$
And should read:
$$SP_i = R_i \ SJ : \Pi_\rho \times \Pi_\theta \to \Omega_S \subset \mathbb{C}^M \quad i^{th} \text{ Matched Signal Projection} \quad \text{Equation (5)}$$

In Column 11, Equation (6) is:
$$JP_i = R_i^\perp \cdot SJ : \Pi_\rho \times \Pi_\theta \to \Omega_s \subset \square^M \quad i^{th} \text{ Mismatched Projection} \quad \text{Equation (6)}$$
And should read:
$$JP_i = R_i^\perp \ SJ : \Pi_\rho \times \Pi_\theta \to \Omega_S \subset \mathbb{C}^M \quad i^{th} \text{ Mismatched Projection} \quad \text{Equation (6)}$$

In Column 11, Line 12, the equation is:
$$Y_{RD} = (JP^H \cdot JP)^{-1} JP^T = Q^{-1} \cdot SP^T$$
And should read:
$$Y_{RD} = \left(\overline{JP}^H \ \overline{JP}\right)^{-1} \overline{SP}^T \ Q^{-1} \ \overline{SP}^T$$

In Column 11, Equation (7) is:
$$\overline{SP} = \overline{R}^H \cdot (S+J) \subset \square^L \times \square^M, \qquad \text{Equation (7)}$$
And should read:
$$\overline{SP} = \overline{R}^H \subset \mathbb{C}^l \times \mathbb{C}^M, \qquad \text{Equation (7)}$$

In Column 11, Equation (8) is:
$$\overline{JP} = \overline{R}^{\perp H} \cdot (S+J) \subset \square^K \times \square^M \text{ (Orthogonal projection to } R) \qquad \text{Equation (8)}$$
And should read:
$$\overline{JP} = \overline{R}^{\perp H} (S+J) \subset \mathbb{C}^K \times \mathbb{C}^M \quad \text{(Orthogonal projection to } R) \quad \text{Equation (8)}$$

In Column 11, Equation (9) is:
$$Q(\overline{JP}) = \overline{JP}^H \overline{JP} \subset \square^M \times \square^M, \text{ and} \qquad \text{Equation (9)}$$
And should read:
$$Q(\overline{JP}) = \overline{JP}^H \overline{JP} \subset \mathbb{C}^M \times \mathbb{C}^M, \text{ and} \qquad \text{Equation (9)}$$

In Column 11, Equation (10) is:
$$P(SJ) = SJ^H SJ \subset \square^M \times \square^M. \qquad \text{Equation (10)}$$
And should read:
$$P(SJ) = SJ^H SJ \subset \mathbb{C}^M \times \mathbb{C}^M. \qquad \text{Equation (10)}$$

In Column 11, Line 52 is:
space defined as $\overline{JP} = SJ * \overline{R}^{195}$, which includes clutter alone, is
And should read:
space defined as $\overline{JP} = SJ \ \overline{R}*$, which includes clutter alone, is